Patented Aug. 25, 1953

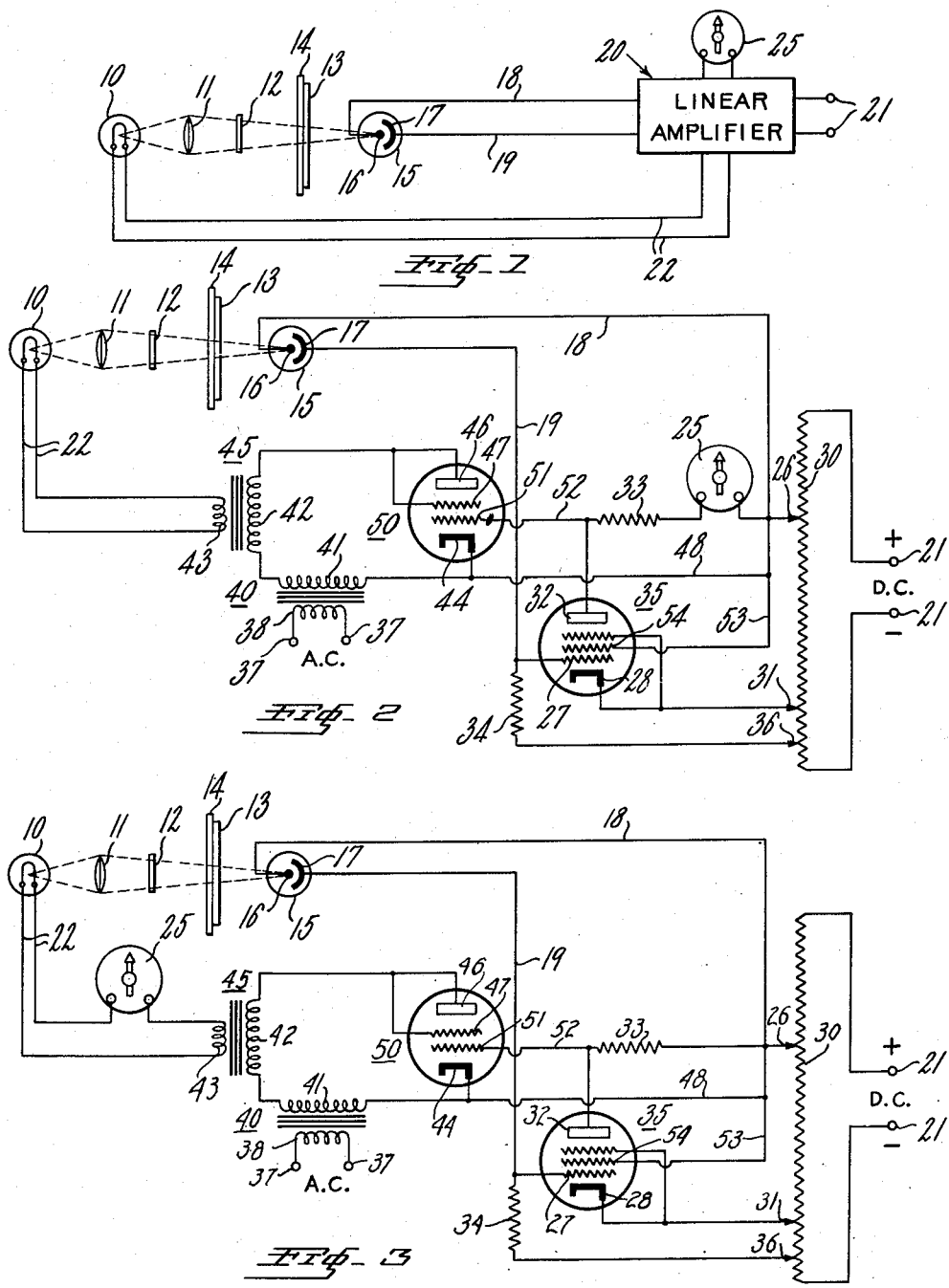

2,649,834

UNITED STATES PATENT OFFICE 2,649,834

OPTICAL FEED-BACK DENSITOMETER

Monroe Hamilton Sweet, Binghamton, N. Y., assignor to General Aniline & Film Corporation, New York, N. Y., a corporation of Delaware Application April 4, 1946, Serial No. 659,457

3 Claims. (Cl. 88—14)

This invention relates to logarithmically responsive measuring circuits, and more particularly to circuits including feedback means controlling the output of an energy emitting device in response to the output of an energy sensitive element receiving incident energy from the device.

In numerous mensuration operations, an object is to obtain a direct indication of values which are logarithmic functions of the measured quantity. A typical example is the measurement of the density of a photographic film. In the usual measuring instrument for determining the value of the film density, the light flux transmitted through the film is directed upon a suitable photo sensitive device, such as a photoemissive vacuum tube. The output of the phototube is then amplified and the relative value thereof indicated upon a suitable current measuring meter. The radiant flux incident upon the phototube is an inverse logarithmic function of the density of the film. If the output of the phototube is linearly amplified, the indicating meter must be provided with a scale which is graduated logarithmically, if it is desired to read density directly on the meter. As is known, a logarithmic scale is non-uniformly graduated, the indicia thereof being crowded near one end of the scale and being widely spaced near the opposite end thereof. The non-uniformity of the scale graduations adversely affects the accuracy and facility of the meter readings.

Various expedients have been proposed for obtaining direct indications of density on a meter having a substantially uniformly graduated scale. Among other expedients, cut pole pieces have been used in the meter to vary the sensitivity of response thereof over different portions of the scale. The results obtainable by such expedients have been generally unsatisfactory. In my copending application Serial No. 452,697, filed July 29, 1942, for "Direct Reading Densitometer," now issued as U. S. Pat. 2,406,716, there is described and claimed a suitable electronic measuring circuit for obtaining direct readings upon a uniformly graduated meter scale of the density of a photographic film. In this circuit, a logarithmic amplifier is provided between the output of a phototube and the indicating meter. The parameters of the amplifier are so selected that the meter indicates directly the density of the sample upon a uniformly graduated scale. The light flux incident upon the phototube is an inverse logarithmic function of the density of the sample, and the output current of the phototube is a direct function of the light incident thereupon. By interposing a logarithmically responsive amplifier between the phototube and the meter, such compensation is effected that the relative current flowing through the meter becomes a direct function of the density of the sample. The described circuit has had very satisfactory commercial use.

In the above described direct reading densitometer, the amplifier parameters must be so selected that the amplifier is operating at values such that the grid potential is a logarithmic function of the grid current. It is in some respects desirable to employ a conventional amplifier where the grid potential or the amplifier response is linearly related to the phototube current. Accordingly, the present invention comprises a measuring circuit in which although a linear amplifier is used direct indication is obtained of logarithmic values the necessary compensation in the indication is effected by controlling the luminous excitation of the light source in accordance with the response of a photo-emissive vacuum tube or similar photo-sensitive elements.

It is, therefore, among the objects of this invention to provide a simple, logarithmically responsive measuring circuit; to provide such a circuit including a linear amplifier controlling the energization of an energy emitting element responsive to the output of an energy sensitive element receiving incident energy from the energy emitting element; to provide a logarithmically responsive measuring circuit including a light source, a photo-emissive vacuum tube arranged in operative relation therewith, and a linear amplifier controlling the energization of the light source responsive to the output of the photo-emissive vacuum tube; and to provide such a logarithmically responsive measuring circuit in which the indicating means may be connected either in the output circuit of the amplifier or in the input circuit of the light source.

These and other objects, advantages and novel features of the invention will be apparent from the following description and the accompanying drawing. In the drawing:

Fig. 1 is a schematic diagram illustrating the operation of the measuring circuit of the present invention.

Fig. 2 is a schematic circuit diagram of one embodiment of the invention.

Fig. 3 is a schematic circuit diagram of another embodiment of the invention.

According to the present invention, a radiant flux sensitive element is arranged in operative relation to receive flux from a radiant flux emitting device.

The light sensitive element of the type used herein has such characteristics that its electrical output is a linear function of the incident light radiation. When the arrangement is used to measure a logarithmic function, for example the density of a sample interposed between the light source and the photo-electric tube, the photo tube current is amplified and the output of the amplifier is utilized to control variable resistance means which in turn controls the luminous excitation of the light source. In this manner a feedback loop is established between the linearly amplified output of the photo tube and the source from which excitation of the light is derived.

The light source employed comprises a lamp which converts electrical energy into radiant energy and has such inherent characteristics that the radiant energy bears a logarithmic relation to the electrical energy supplied to the lamp; in other words the candle power output thereof varies approximately logarithmically as a function of the electric current or voltage applied to the lamp. Various types of incandescent lamps are known to possess this desirable characteristic.

It was mentioned before that in determining the density the radiant flux incident upon the photo tube is an inverse logarithmic function of the density of the film. Consequently, when this circuit is used for density measurements the amount of light reaching the photo tube from the lamp through the sample varies inversely with the logarithm of the density. The measuring instrument connected directly to indicate the photo tube current would require a logarithmic scale unless provision is made for changing this indication, that is for correcting the indication in accordance with a logarithmic compensator. Instead of varying the indication of the meter anywhere in its energizing circuit the light intensity which excites the photo tube is caused to vary in such manner as to compensate for the linear response of the photo tube and provide a logarithmic response in the system. With this compensation in the circuit response, the indicating meter may have a standard, a uniformly graduated scale to give direct readings of the density of the sample interposed between the lamp and the photo tube.

Referring to Fig. 1 of the drawing, the invention is illustrated, by way of example, as incorporated in a direct reading densitometer in which a uniformly graduated scale meter provides direct indications of the density of a sample being examined. For this purpose, light from a suitable electric lamp 10, which is preferably an incandescent lamp, is concentrated by a condenser lens 11 and directed, through a suitable filter 12 and a sample 13 mounted on a support 14, upon the cathode 16 of a photo-emissive vacuum tube 15. Cathode 16 and anode 17 are connected by conductors 18 and 19, respectively, to the input of a linear amplifier 20. Amplifier 20 is supplied with operating potential from a suitable source of preferably constant direct current potential not shown here, connected to terminals 21. The amplifier includes means for controlling the illumination of lamp 10, in a manner described more fully hereinafter, and for this purpose the lamp 10 is shown connected to the amplifier by means of conductors 22. A suitable indicating meter 25, is actuated by the amplifier 20, and is shown connected thereto as indicated.

The operation of the arrangement is as follows. The density of sample 13 is an inverse logarithmic function of its light transmission. The transmission, in turn, is a measure of the amount of light reaching phototube 15 from source 10 through the sample with a constant intensity of the source. From the data relating lamp current or voltage applied to its terminals to relative lamp candle power, it can be shown that the candle power is a logarithmic function of the applied voltage, insofar as respects an incandescent lamp (see Weaver & Hussong "Note on the Color Temperature—Candle Power Characteristics of Tungsten Lamps," J. O. S. A. 29, 17 Jan. 1939). Accordingly, if the operating potential applied to light source 10 is modified as an inverse function of the output current of phototube 15, the candle power of source 10 will be varied logarithmically as an inverse function of the phototube output current. Consequently a suitable current or voltage indicating means connected either in the output circuit of phototube 15 or the energizing circuit of source 10 will directly indicate the density on a uniformly graduated scale.

In effect, the intensity of lamp 10 is controlled in such a manner that at low densities (i. e. high light transmission values) the light flux incident upon photo tube 15 is a minimum, and as the density of sample 13 increases (i. e. less light is transmitted), the intensity of lamp 10 is also increased. With such arrangement, it is possible to obtain a uniform response of meter 25 to the density of sample 13.

If meter 25 is calibrated to read densities from 0.0 to 3.0, which is a useful range, and with high linear amplification of the output current of photo tube 15, the following relationships apply:

$$F_C = \frac{M}{F_U}$$

where $F_C$ is the lamp intensity as automatically corrected, or modulated, to obtain direct readings of density upon the substantially uniformly graduated scale of meter 25, M is the relative meter response and $F_U$ is the relative light flux which would be transmitted if the lamp intensity were not modulated. Furthermore, $$F_U = \text{antilog } (3.0 - D)$$

where D is the density of sample 13 and unit flux is assumed for the lamp at density 3.0. From these two equations, it will be apparent that $$F_C = \frac{M}{\text{antilog } (3.0 - D)}$$

in other words, in order to obtain uniform meter response for differing density values of sample 13, the corrected lamp intensity must vary directly as the meter response and inversely as the antilog of the total meter density reading minus the density of sample 13. As explained above, this is accomplished in the present circuit by linear modulation of the operating potential applied to light source 10, which results in logarithmic modulation of the candle power or flux output thereof.

Fig. 2 represents a specific embodiment of an arrangement for obtaining the results of the circuit of Fig. 1. The operating potentials are derived from a suitable source of substantially constant direct current potential connected between terminals 21 to a potentiometer or voltage divider 30. Cathode 16 of photo tube 15 is connected through conductor 18 to a tap 26 on potentiometer 30. Conductor 19 connects anode 17 to the control grid 27 of an electronic amplifier tube 35. Cathode 28 of tube 35 is connected to a tap 31 of potentiometer 30. Anode or plate 32 of tube 35 is connected through a suitable load resistor 33 and in series with the indicating meter 25 to tap 26.

The load resistor 34 of the photo tube 15 is also utilized as the input circuit or grid resistance for the amplifier tube 35. A minimum bias voltage for this tube is derived from the voltage divider between cathode 28 and tap 36. The ohmic value of resistor 34 is preferably high in the neighborhood of 20 megohms in order to insure a satisfactory voltage drop for biasing the amplifier tube 35 when the photo tube is conducting.

With the described arrangement, as the light falling upon phototube 15 from source 10 through sample 13 increases, the phototube output current increases. This current produces a voltage drop across resistor 34 driving the control grid 27 more positive which increases the conductivity of tube 35. The increase or decrease in the conductivity of tube 35 is utilized to change the effective bias voltage of a control tube 50. The purpose of this arrangement will be apparent hereinafter.

The incandescent lamp 10 is energized from an alternating current source connected to terminals 37 and applied to the primary winding 38 of a transformer 40. The secondary winding 41 of transformer 40 is connected in series with the primary winding 42 of a voltage reducing transformer 45 and control tube 50. Conductors 22 connect the secondary winding 43 of transformer 45 to the filament of lamp 10. In a specific example, transformer 40 raises the potential of the supply line to 500 volts in order to provide sufficient anode voltage for the control tube 50. Transformer 45 reduces the voltage applied to the primary winding 42 to about six volts, required for the lamp 10 which has preferably a six candle power rating.

The secondary winding 41 of transformer 40 and the primary winding 42 of transformer 45 are in series and the free terminals thereof connect to the anode 46 and cathode 44 of the control tube 50, respectively. The circuit of the control grid 51 is completed to the cathode 44 through the anode load resistance 33 of the amplifier tube 35 in series with the indicating meter 25. The screen grid 47 is not used in this particular arrangement, and therefor is connected to the anode 46 and the tube 50 is actually operating as a triode.

As can be seen from the circuit the effective anode voltage for the tube 50 is derived from the secondary winding 41 of the transformer 40, whereas the grid voltage is derived from the current flowing through the load resistor 33. When there is no current flowing in this resistor the grid 51 has zero bias and is effectively at cathode potential. This condition calls for maximum anode current of tube 50 providing a maximum energy transfer from the A. C. source to the exciter light 10. Any variation in conductivity of the tube 35 will cause corresponding current variations in the load resistor 33 resulting in a corresponding grid voltage for the tube 50. This voltage is negative with respect to the cathode 44 inasmuch as the conductivity of the amplifier tube 35 impresses on the grid 51 a potential more negative than the cathode 44. Current variations of the tube 35 as pointed out above depend on the light intensity reaching the photo cell and is a direct function thereof. These variations impressed on the control tube 51 will cause variations in the light intensity of the exciter lamp 10 inasmuch as the current in the primary winding 42 depends on the conductivity of the tube 50. In view of the fact that the characteristics of the exciter lamp 10 are such that variations of filament excitation produces a logarithmic variation of candlepower output the light energy impressed on the photocell will vary logarithmically with respect to the linear variation of energizing voltage of the lamp 10.

As set forth above, the anode potential of the tube 35 varies inversely with the output current of phototube 15, and thus inversely as a linear function of the light incident upon the latter from lamp 10 through sample 13. Accordingly, the illumination of lamp 10 is varied as an inverse logarithmic function of the light incident upon phototube 15. Meter 25 measures the current flow in the output circuit of amplifier 35, and thus indicates directly, on a uniformly graduated scale, the density of sample 13 as measured by phototube 15, in accordance with the relations between compensated lamp intensity and incident flux versus meter reading set forth above.

Fig. 3 represents another embodiment of the invention which differs from that shown in Fig. 2 only in the location of meter 25. In Fig. 3, elements identical with those in Fig. 2 have been given the same reference characters. As shown, meter 25 is connected in the supply circuit of lamp 10, being serially interposed between conductor 22 and one terminal of winding 43. As the energizing voltage of lamp 10 varies with the conductivity of control tube 50 which is dependent on the anode voltage of tube 35 the same relation exists as in the circuit of Figure 2 and the current indication of meter 25 directly represents the density of sample 13 upon a uniformly graduated scale. The circuit of Fig. 3 otherwise operates in the same manner as does the circuit of Fig. 2.

With the described arrangements, an optical feed back effect is produced in which the energization of the light source is varied as an inverse function of the phototube output current. This, in turn, varies the lamp intensity as an inverse logarithmic function of the phototube output current. Consequently, logarithmic compensation useful in density measurements is automatically accomplished so that a meter whose response is linear with respect to current may be used to directly indicate density upon a substantially uniformly graduated scale. Thus, a logarithmically responsive measuring circuit is provided incorporating a linear non-compensated amplifier which need not be operated under such conditions as to have a logarithmic relation of grid potential to grid current.

It will be understood that other means of controlling the energizing current of the light source in response to the output of the phototube may be used. For example, a radio frequency oscillator circuit, such as commonly used in sound motion picture projectors for the exciter lamps, may be incorporated in the present arrangement. The essential requirement is that the intensity of the light source decreases in response to an increase in the flux incident upon the photo element, and that the overall gain of the amplifier system is high.

An inherent characteristic of the described circuits is that, if the phototube-amplifier system has an extremely high gain, the amplifier system need not provide linear amplification. Thus, the amplification ratio may vary very widely over the operating range without adversely affecting the performance of the circuits.

While specific embodiments of the invention have been shown and described in detail to illustrate the application of the principles thereof, it will be understood that the invention may be otherwise embodied without departing from such principles.

What is claimed is:

1. An electrical measuring system for determining the density of translucent materials, comprising a photoelectric tube, a load resistance and a source of operating potential for said tube, an exciter light arranged to illuminate said photo tube through said translucent materials, said exciter light comprising a filamentary incandescent lamp having such characteristics that the light intensity emitted therefrom bears a logarithmic relation to the electrical energy supplied to said filament, a circuit for energizing said filament including a source of potential and a vacuum tube having anode and cathode electrodes connected effectively between said source and said filament and a grid electrode connected to said cathode through a grid resistor, the conductivity of said vacuum tube determining the current supplied to said filament and control means comprising an amplifier tube having an input circuit including said load resistance, and an output circuit including said grid resistor, whereby current variations in said output circuit control the conductivity of said vacuum tube in inverse relation to the response of said photo tube and the light intensity of said lamp is varied in inverse relation to the density of said material and a current indicating device connected in said filament circuit the indication of which may be marked directly in linearly spaced values of density.

2. An electrical measuring apparatus for directly indicating the photographic density of translucent sample materials, comprising a photoelectric tube, a source of operating potentials therefore, an exciter lamp arranged to illuminate said tube through samples which may be placed between said lamp and said tube, said lamp being of the filamentary incandescent type having such characteristics that the light intensity emitted therefrom bears a logarithmic relation to the electrical current supplied to the filament, a circuit for supplying current to said filament, electronic means of variable conductivity in said circuit for varying the magnitude of said filament current, electronic control means connected between said phototube and said filament current varying means operable to alter the conductivity thereof in inverse relation to the phototube current which is directly related to the light reaching said phototube upon a sample being placed between said lamp and said phototube whereby the light intensity of said lamp is varied in inverse relation to the density of said sample, and a current flow measuring means in said filament circuit the indication of which may be marked directly in linearly spaced density values.

3. An electrical measuring apparatus for directly indicating the photographic density of translucent sample materials, comprising a photoelectric tube, a source of operating potentials therefore, an exciter lamp arranged to illuminate said tube through samples which may be placed between said lamp and said tube, said lamp being of the filamentary incandescent type having such characteristics that the light intensity emitted therefrom bears a logarithmic relation to the electrical current supplied to the filament, a circuit for supplying current to said filament, including a vacuum tube the conductivity of which controls the magnitude of said filament current, electronic control means connected between said phototube and said vacuum tube for altering the conductivity thereof in inverse relation to the phototube current which is directly related to the light reaching said phototube upon a sample being placed between said lamp and said phototube whereby the light intensity of said lamp is varied in inverse relation to the density of said sample, and a current flow measuring means in said filament circuit the indication of which may be marked directly in linearly spaced values of density.

MONROE HAMILTON SWEET.

References Cited in the file of this patent

UNITED STATES PATENTS

| Number | Name | Date |
| --- | --- | --- |
| 1,881,336 | Voigt | Oct. 4, 1932 |
| 1,973,469 | Denis | Sept. 11, 1934 |
| 2,096,323 | Gille | Oct. 19, 1937 |
| 2,241,557 | Nichols | May 13, 1941 |
| 2,241,743 | Schoene | May 13, 1941 |
| 2,245,124 | Bonn | June 10, 1941 |
| 2,413,706 | Gunderson | Jan. 7, 1947 |